US011772732B2

(12) United States Patent
Jau et al.

(10) Patent No.: US 11,772,732 B2
(45) Date of Patent: Oct. 3, 2023

(54) BICYCLE BELL

(71) Applicant: Jet Rider Co., Ltd., Taichung (TW)

(72) Inventors: Je-Kuan Jau, Taichung (TW); Chien-Hua Li, Taichung (TW)

(73) Assignee: Jet Rider Co., Ltd., Taichung (TW)

( * ) Notice: Subject to any disclaimer, the term of this patent is extended or adjusted under 35 U.S.C. 154(b) by 141 days.

(21) Appl. No.: 17/462,320

(22) Filed: Aug. 31, 2021

(65) Prior Publication Data

US 2022/0081051 A1 Mar. 17, 2022

(30) Foreign Application Priority Data

Sep. 11, 2020 (TW) .................................. 109211975

(51) Int. Cl.
*B62J 3/04* (2020.01)
*B62J 3/00* (2020.01)

(52) U.S. Cl.
CPC ... *B62J 3/04* (2020.02); *B62J 3/00* (2013.01)

(58) Field of Classification Search
CPC ....................................... B62J 3/04; B62J 3/00
See application file for complete search history.

(56) References Cited

U.S. PATENT DOCUMENTS

| 239,013 | A | * | 3/1881 | Connell | A47G 19/2227 |
| | | | | | 116/155 |
| 1,848,020 | A | * | 3/1932 | Merrill | G10K 1/32 |
| | | | | | 116/150 |
| 6,125,785 | A | * | 10/2000 | Asheri | G10K 1/072 |
| | | | | | 116/167 |
| 6,739,282 | B1 | * | 5/2004 | Yuan | G10K 1/071 |
| | | | | | 116/167 |
| 7,182,039 | B2 | * | 2/2007 | Ichimura | G10K 1/072 |
| | | | | | 116/167 |
| 7,225,753 | B1 | * | 6/2007 | Lo | G10K 1/072 |
| | | | | | 116/167 |
| 7,424,863 | B2 | * | 9/2008 | Tsai | G10K 1/072 |
| | | | | | 188/24.11 |
| 9,240,175 | B1 | * | 1/2016 | Wyche | G10K 1/10 |
| D774,410 | S | * | 12/2016 | Lacy | D10/118 |
| 9,734,813 | B2 | * | 8/2017 | Lacy | B62J 3/04 |
| D878,948 | S | * | 3/2020 | Ke | D10/118 |
| 2020/0327874 | A1 | * | 10/2020 | Slone | G10K 1/072 |
| 2022/0355880 | A1 | * | 11/2022 | Blaabjerg | B62J 3/04 |

FOREIGN PATENT DOCUMENTS

TW I318948 B 1/2010

OTHER PUBLICATIONS

Https://www.mtbbell.com/, Timber Mountain Bike Bells, 7 pages, 2019.

* cited by examiner

*Primary Examiner* — John Fitzgerald
*Assistant Examiner* — Tania Courson (57) ABSTRACT

This invention discloses a bicycle bell that combines the functions of a single-stroke bell and an automatic striking bell. The bicycle bell of the invention includes a base portion and a bell portion, and the base portion has a limiting column protruding from the base portion, and the bell portion includes a shell assembly and a clapper assembly movably installed in the shell assembly, and the shell assembly is sheathed on the limiting column and can be fixed to a first position and a second position of the limiting column, and the clapper assembly is held by the limiting column to limit the movement of the clapper assembly, when the shell is situated in the second position.

6 Claims, 8 Drawing Sheets

BICYCLE BELL

FIELD OF THE INVENTION

The present invention relates to a bell, and more particularly to a bicycle bell.

BACKGROUND OF THE INVENTION

Conventional bicycle bell can be divided into two types: single-stroke bell and automatic striking bell. The single-stroke bell operates by pressing a striker to strike the bell to warn animals, people or cars in front of a bicycle; and the automatic striking bell automatically strikes the bell with the vibration produced by the riding on the rugged road to make a sound to warn the front, so as to avoid collisions or accidents, but this type of bells cannot stop striking during the ride.

SUMMARY OF THE INVENTION

It is a primary objective of the present invention to overcome the problem of the conventional automatic striking bell (being unable to stop striking) by providing a novel bicycle bell that combines the functions of both single-stroke and automatic striking bells.

To achieve the aforementioned and other objectives, the present invention discloses a bicycle bell, comprising: a base portion and a bell portion, wherein the base portion has a limiting column protruding from the base portion, and the bell portion comprises a shell assembly and a clapper assembly movably installed in the shell assembly, and the shell assembly is sheathed on the limiting column and can be arranged selectively at a first position and a second position of the limiting column, and the clapper assembly is held by the limiting column to restrict the movement of the clapper assembly, when the shell is situated in the second position.

Wherein, the base portion comprises a bottom plate and a limiting column; the limiting column protrudes from one of the sides of the bottom plate; the limiting column comprises a center groove, at least one rib and two mechanical sections; the center groove passes through the limiting column; the rib protrudes outwardly from a middle section of the limiting column; and the rib separating the limiting column defines the two mechanical sections on the limiting column.

Wherein, the bell portion comprises a shell assembly and a clapper assembly; the shell assembly comprises a sliding base and a shell; the sliding base is movably sheathed on one of the two mechanical sections; the movement of the sliding base along the limiting column is restricted by the rib; the sliding base comprises a hanging arm transversely passing through the center groove, and both ends of the hanging arm are coupled to the sliding base; and the shell disposed on a circular sidewall of the sliding base extends in a direction towards the free end of the limiting column to form a bell structure.

The clapper assembly comprises a clapper and a hanging ring, and the clapper has a protruding boss extending outwardly from the clapper, and the protruding boss has an outer diameter smaller than the center groove, and the hanging ring is installed at an end of the protruding boss and couples the clapper assembly with the shell assembly.

Further, the free end of the limiting column is concavely formed into a limiting section.

Further, a restorable striking portion is installed adjacent to the base portion for striking an outer side of the shell.

When the bicycle bell of the present invention is used during the ride, a pushing or pulling force can be applied to the shell to move the bell portion between the two mechanical sections of the base portion in order to adjust the relative positions of the clapper and the limiting column. This way the bell can be switched between the free striking state and the off state. When the bicycle bell is situated in the free striking state, the clapper moves freely and is able to strike the shell from the vibration during the ride. When the bicycle bell is situated in the off state, the clapper is constrained by the limiting column so that the clapper is unable to strike the shell to make a sound. If the rider wants to ring the bicycle bell when it is situated in the off state, the rider can apply a pushing or a pulling force to the striking portion, so that the striker strikes the shell by the rebound force to make a sound. This novel bell design's automatic striking function can switch on or off, while maintaining the single-stroke bell function, so that the rider can switch between the two modes of use according to the riding conditions.

DESCRIPTION OF THE PREFERRED EMBODIMENTS

To make it easier for our examiner and people having ordinary skill in the art to understand the objective of the invention, its structure, innovative features, and performance, we use preferred embodiments together with the attached drawings for the detailed description of the invention. It is intended that the embodiments and the figures disclosed herein are to be considered illustrative rather than restrictive.

Figure 1:
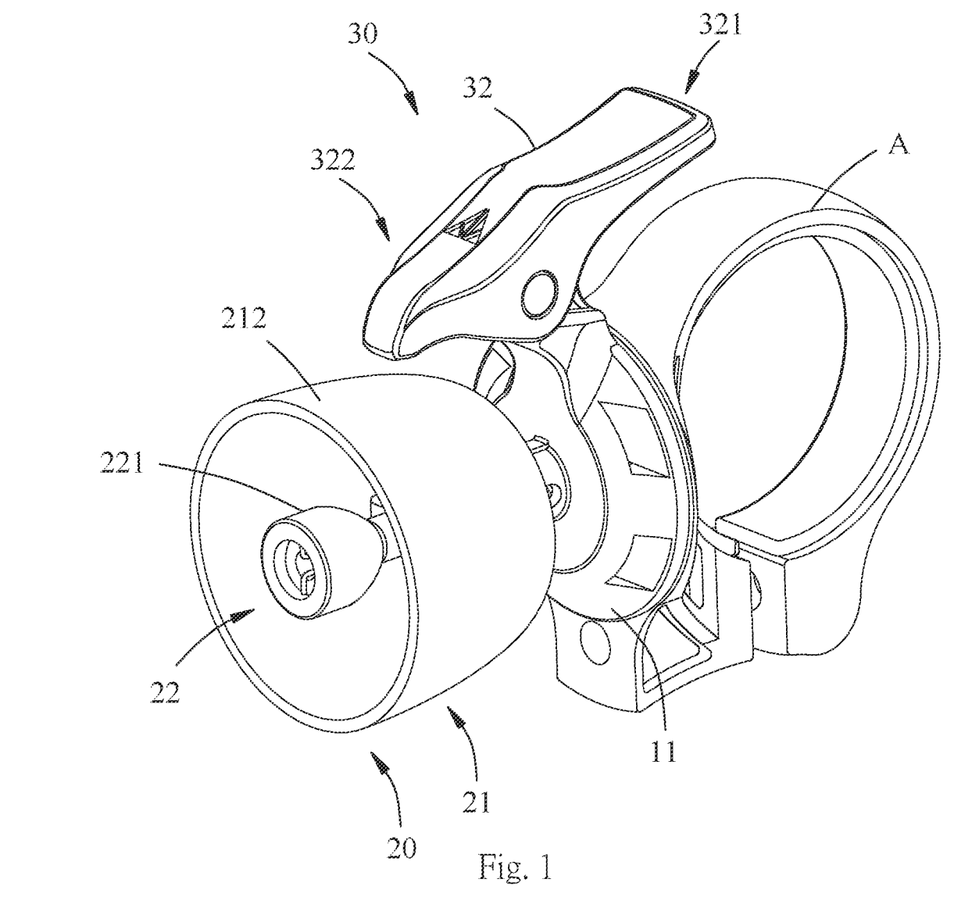
FIG. 1 is a perspective view of a bicycle bell in accordance with a first preferred embodiment of the present invention.
Figure 2:
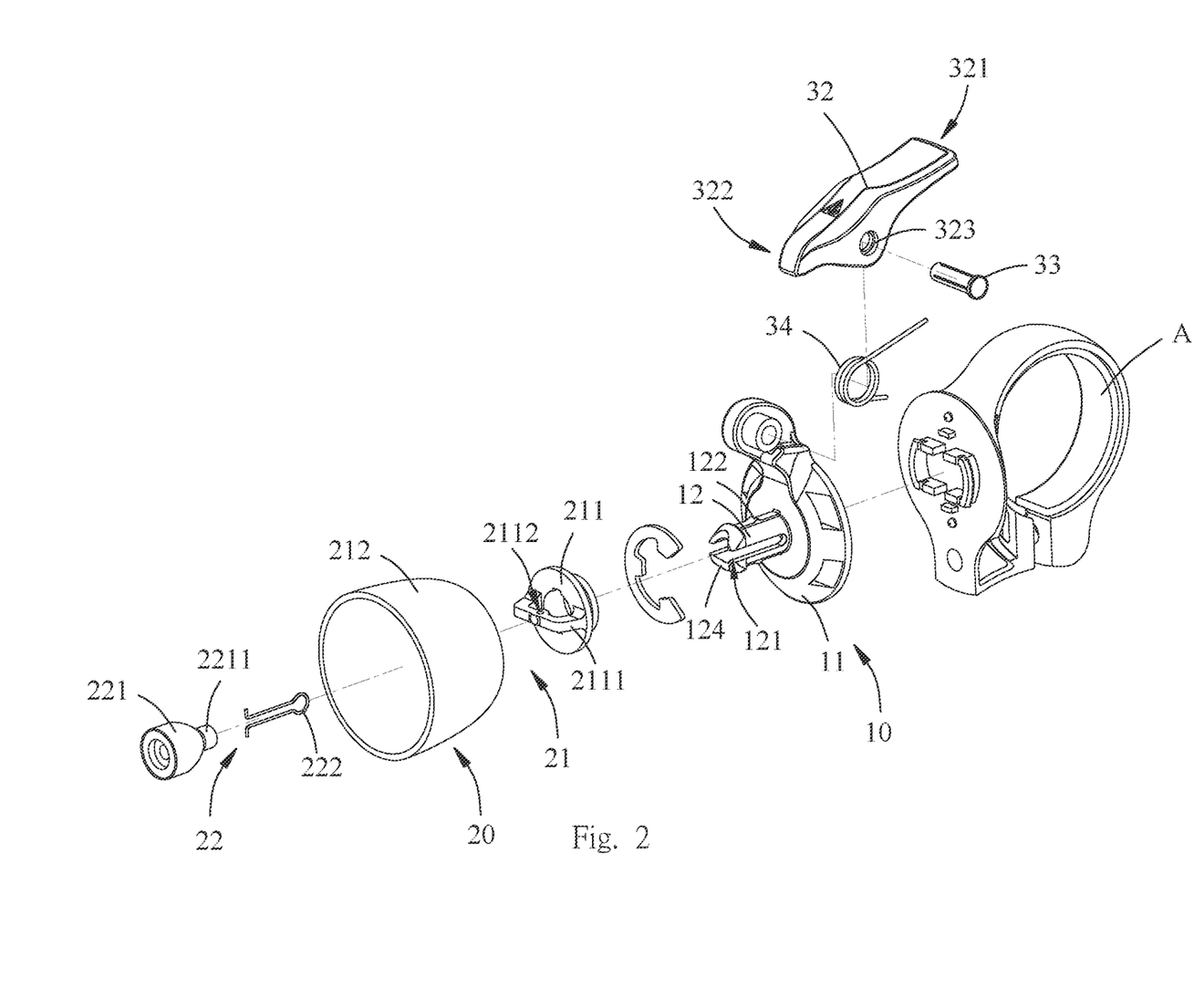
FIG. 2 is an exploded view of a bicycle bell in accordance with the first preferred embodiment of the present invention.

With reference to FIGS. 1 and 2 for a bicycle bell in accordance with a preferred embodiment of the present invention, the bicycle bell comprises a base portion 10, a bell portion 20 and a striking portion 30. The base portion 10 comprises a bottom plate 11 and a limiting column 12, and the bottom plate 11 is a disc structure, and the limiting column 12 protrudes from one of the sides of the bottom plate 11.

The limiting column 12 comprises a center groove 121, at least one rib 122, two mechanical sections 123 and a limiting section 124. The center groove 121 is concavely formed and transversely penetrating through a free end of the limiting column 12, so that the free end of the limiting column 12 is substantially in a double-fork form, and the at least one rib 122 surround and protrude from the middle section of the limiting column 12, so that the limiting column 12 is separated by the at least one rib 122 into two mechanical sections 123. In this embodiment, there are two ribs 122 disposed on the two opposite sides of the middle section of the limiting column 12 respectively, and the limiting section 124 is concavely formed at a free end surface of the limiting column 12. In the present embodiment, limiting section 124 is in pawl shape and protrudes radially from the free end surface of the limiting column 12.

The bell portion 20 comprises a shell assembly 21 and a clapper assembly 22. The shell assembly 21 comprises a sliding base 211 and a shell 212, and the sliding base 211 is in a ring shape with a thickness smaller than or equal to the two mechanical sections 123, and the sliding base 211 is movably sheathed on the two mechanical sections 123. The relative position between the sliding base 211 and the two mechanical sections 123 can be respectively defined a first position A and a second position B shown in FIGS. 3 and 4. Since the ribs 122 protrude outwardly, the movement of the sliding base 211 along the direction of the limiting column 12 is restricted, and the sliding base 211 cannot move back and forth freely between the two mechanical sections 123 shown in FIG. 3. The sliding base 211 comprises a hanging arm 2111 which is rod-shaped, and the hanging arm 2111 transversely pass through the center groove 121, and both ends of the hanging arm 2111 are coupled to the sliding base 211.

Figure 3:
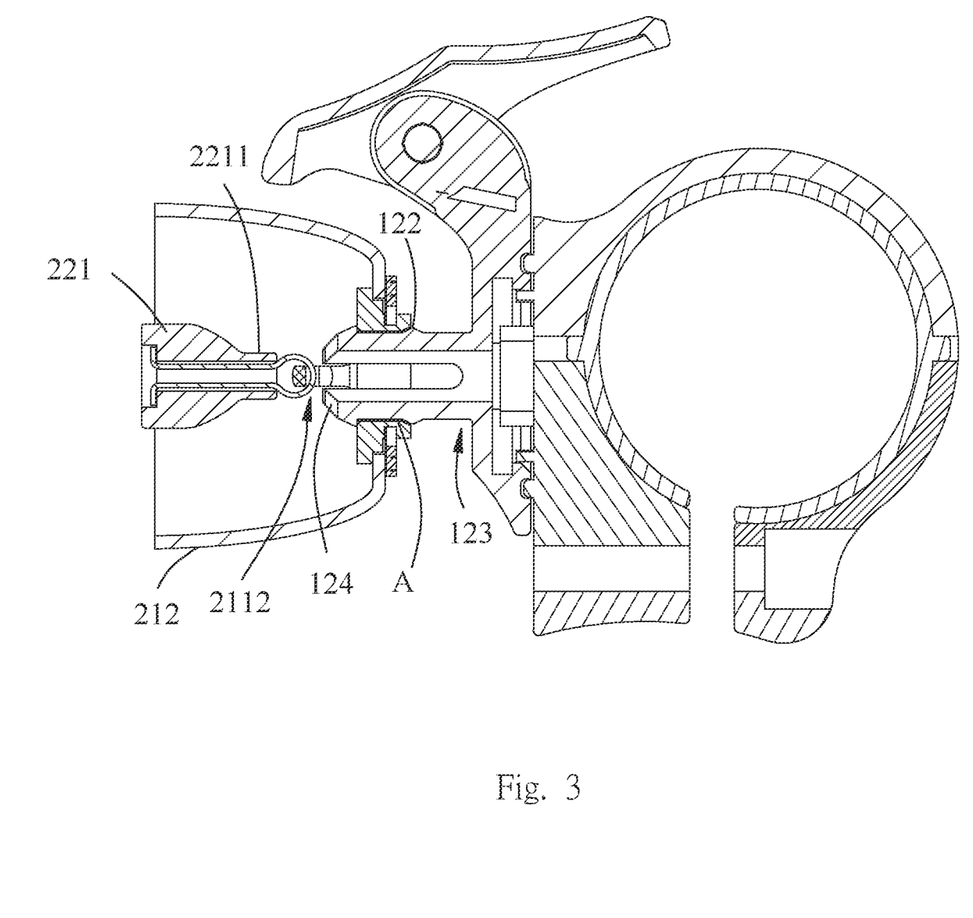
FIG. 3 is a cross-sectional view of a bicycle bell in accordance with the first preferred embodiment of the present invention.
Figure 4:
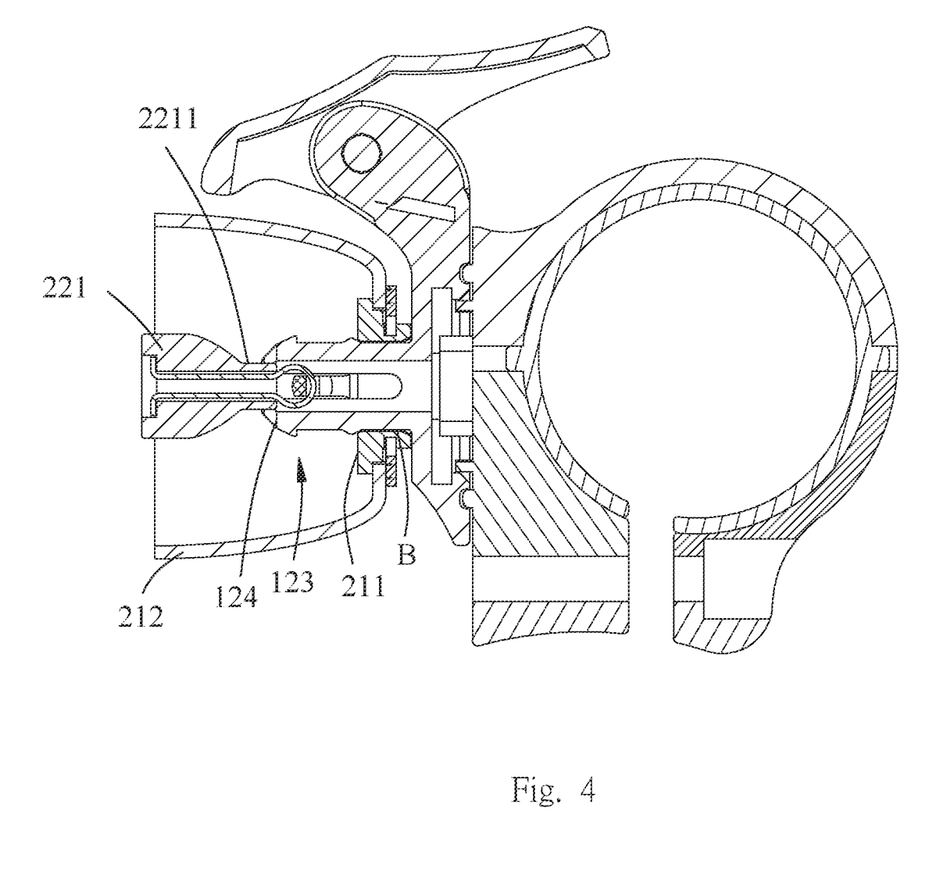
FIG. 4 is a cross-sectional view of a bicycle bell in the off state in accordance with the first preferred embodiment of the present invention.

The shell 212 disposed on a circular sidewall of the sliding base 211 extends in a direction towards a free end of the limiting column 12 to form a bell structure, and covers the periphery of the sliding base 211 and the free end of the limiting column 12 as shown in FIG. 2. In this embodiment, a circular groove is concavely formed around the outer wall of the sliding base 211, and the shell 212 is fixed around the circular groove, and a snap ring is placed into the circular groove to tighten the connection between the shell 212 and the sliding base 211. In FIGS. 3 and 4, when a pushing or pulling force is applied to the shell 212, the sliding base 211 would squeeze the at least one rib 122 and the double-fork structure on the limiting column 12 are deformed to move closer to each other such that the at least one rib 122 cannot restrict the movement of the sliding base 211, and the shell assembly 21 can alter its position between the two mechanical sections 123.

The clapper assembly 22 comprises a clapper 221 and a hanging ring 222, and the clapper 221 has a protruding boss 2211 protrudes outwardly, and the protruding boss 2211 has an outer diameter smaller than the center groove 121 such that the protruding boss 2212 can be accommodated within the center groove 121. The hanging ring 222 is disposed at an end of the protruding boss 2211 and passed through or tied onto the penetrating arm 2111 in the center groove 121 to connect the clapper assembly 22 and the shell assembly 21. In this embodiment, the hanging ring 222 is a hairpin curved wire, and the hanging ring 222 passes through the clapper 221, wherein a closed end of the hanging ring 222 is passed out of an end of the protruding boss 2211, and the circular-shaped closed end of the hanging ring 222 is passed through a hole 2112 formed on the hanging arm 2111 in the center groove 121, and the open end of the hanging ring 222 is snapped fit and connected to the clapper 221.

The first position A and the second position B respectively form a free striking state and an off state of the bicycle bell of the present invention. FIG. 3 shows a preferred embodiment of the present invention for the bicycle bell situated in the free striking state. When the bell portion 20 situated in the free striking state, the sliding base 211 is positioned at the mechanical section 123 near the free end. The protruding boss 2211 of the clapper 221 is at the outside of the limiting section 124. When shaking the bell portion 20, the clapper 221 can move freely and strike the shell 212 owing to the concave shape of the limiting section 124. Accordingly, the bell portion 20 makes a sound.

FIG. 4 shows a preferred embodiment of the present invention for the bicycle bell situated in the off state. To adjust the bell portion 20 to the off state, a pushing or pulling force can be applied to the shell 212 in a direction towards the base portion 10, so that the double-fork structure of the limiting column 12 move closer to each other, and the sliding base 211 moves into the mechanical section 123 near the base portion 10. Since the clapper 221 is connected to the hole 2112, the clapper 221 moves up with the sliding base 211 towards the base portion 10. The protruding boss 2211 is disposed within the limiting section 124. When shaking the bell portion 20, the clapper 221 cannot move freely to strike the shell 212 since the clapper 221 is constrained by the pawl structure of the limiting section 124. As a result, the bell portion 20 cannot make a sound.

Figure 6:
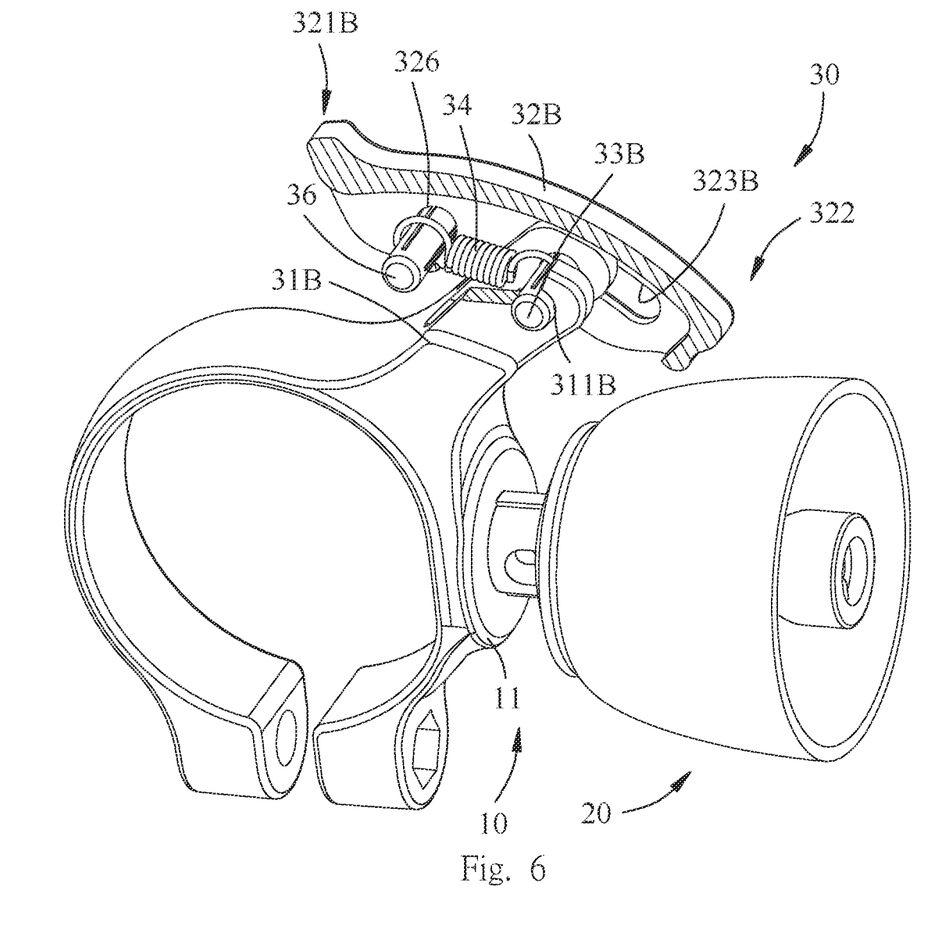
FIG. 6 is a second reference diagram of the second preferred embodiment of the present invention.
Figure 7:
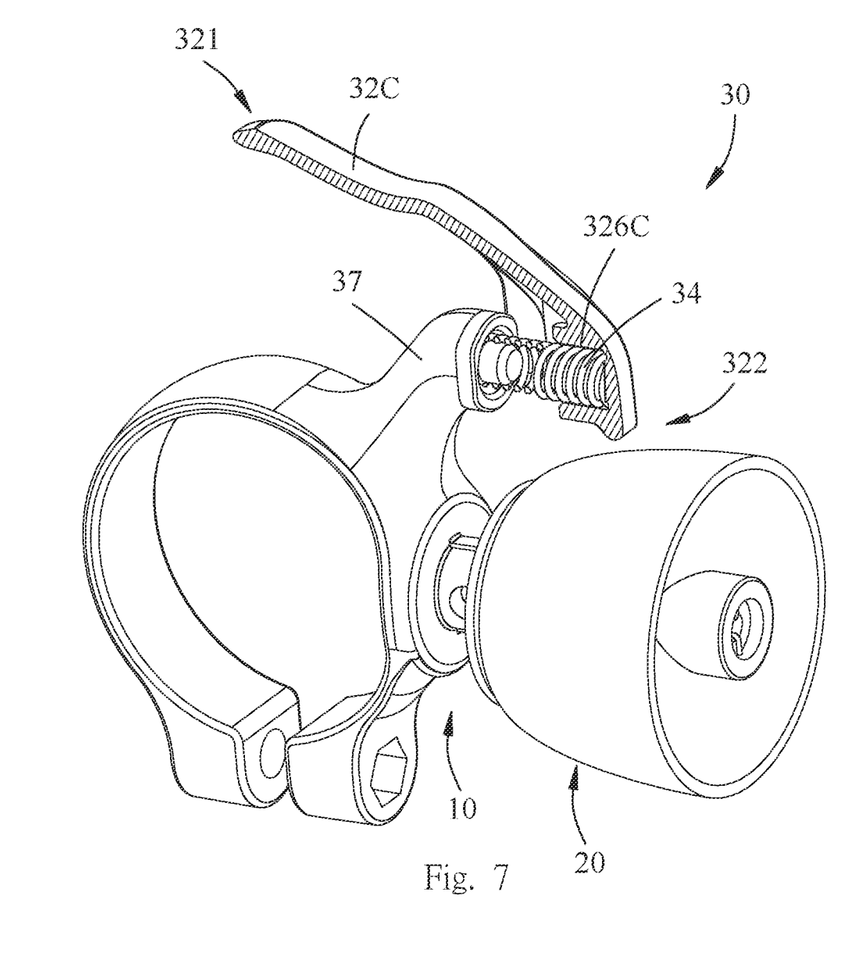
FIG. 7 is a third reference diagram of the second preferred embodiment of the present invention.
Figure 8:
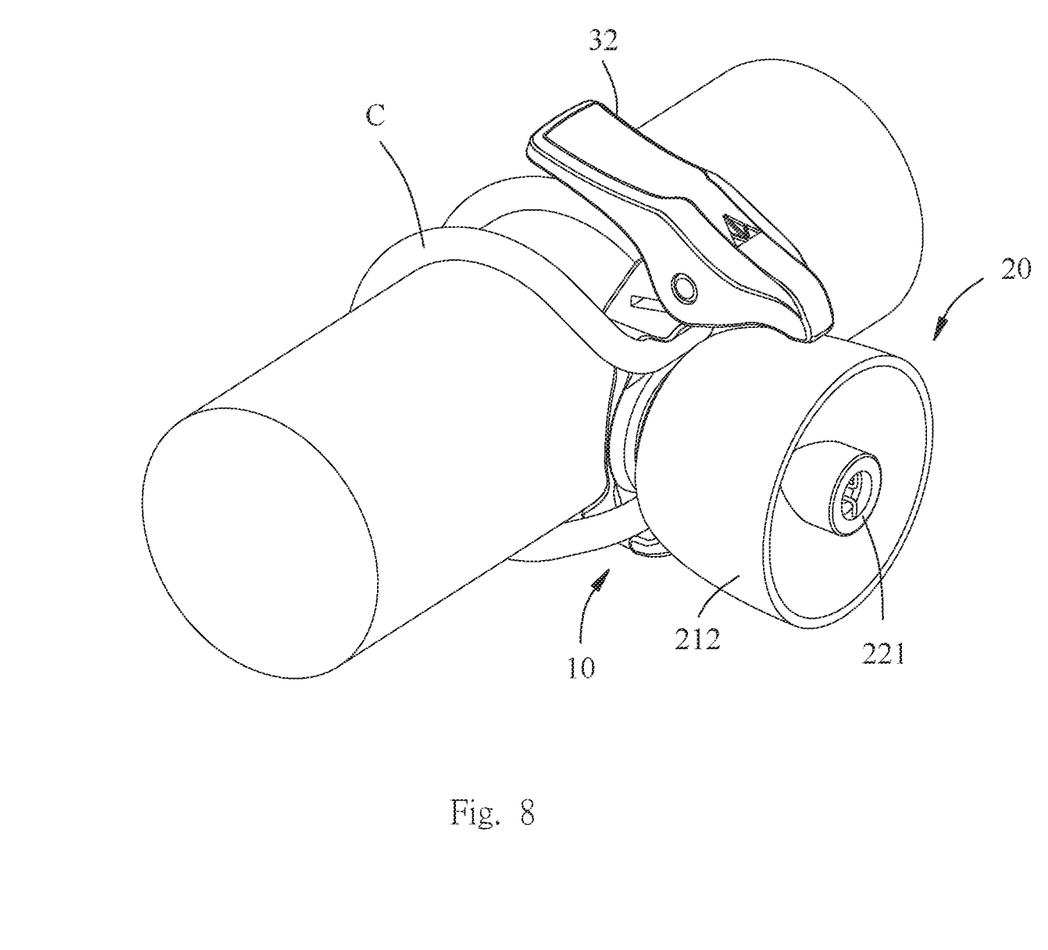
FIG. 8 is a fourth reference diagram of the second preferred embodiment of the present invention.

A restorable striking portion 30 is installed adjacent to the base portion 10, and capable of striking an outer side of the shell 212, so that the bell portion 20 makes a sound. In this embodiment, the striking portion 30 comprises a striking member 32 coupled to the base portion 10 by an elastic member 34. The striking member 32 comprises a hole 323 wherein the striking member 32, the base portion 10, and the elastic member 34 are linked with a rod 33. When a force is applied on the pressing end 321, which is an end of the striking member 32, the elastic member 34 is deformed, and the striking end 322, which is the other end of the striking member 32, moves away from the outer side of the shell 212. When the force is released, the elastic member 34 is restored, so that the striking end 322 bounces back and strikes the shell 212 to make a sound. In FIGS. 2, 6 and 7, the elastic member 34 can be a torsion spring or an extension spring.

Figure 5:
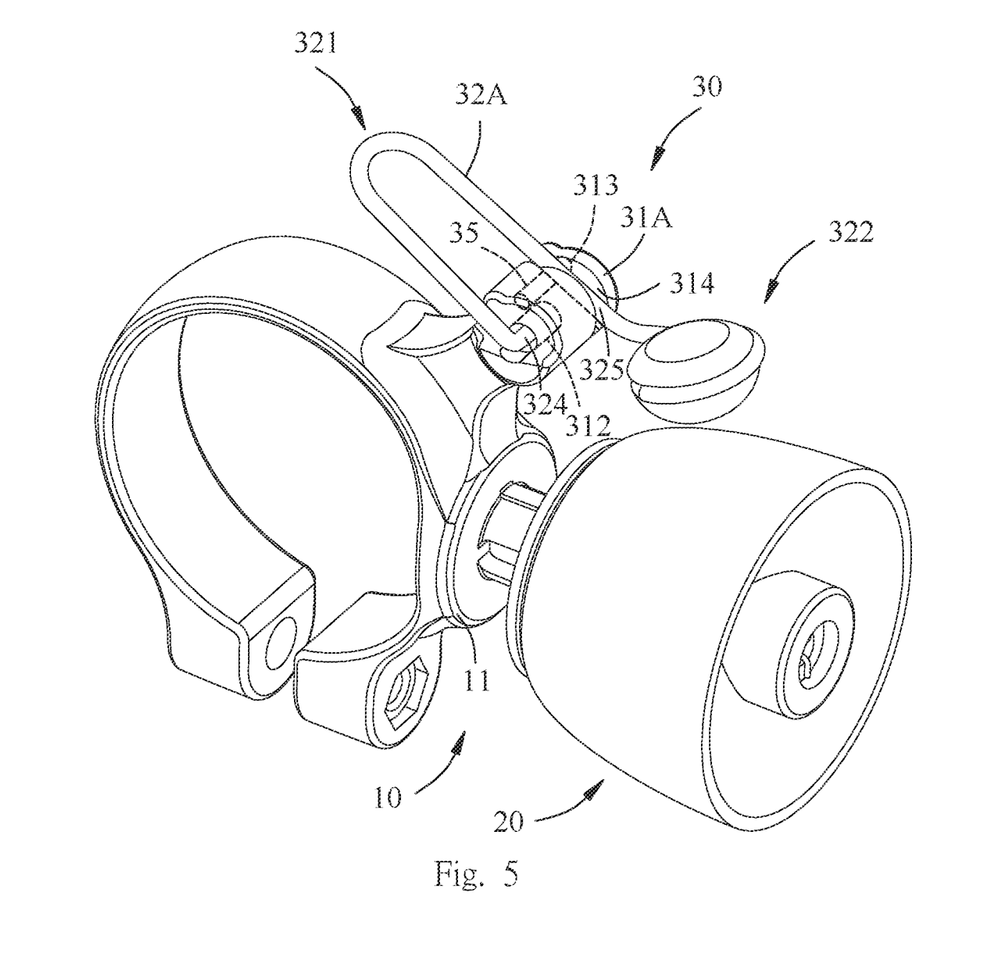
FIG. 5 is a first reference diagram of the second preferred embodiment of the present invention.

FIG. 5 is for the second preferred embodiment of the present invention, the striking portion 30 comprises a cylindrical seat 31A, a striking assembly 32A and a pivot rod 35. The cylindrical seat 31A extends outwardly from an end of the bottom plate 11 and comprises a center hole 312, a pivot hole 313 and a trench 314. A circular side of the cylindrical seat 31A has the center hole 312, and another circular side of the cylindrical seat 31A has the pivot hole 313, and the center hole 312 and the pivot hole 313 are preferably staggered and not connected with each other. Preferably, the pivot hole 313 is passed eccentrically in a direction towards the base portion 10 and disposed on the other circular side of the cylindrical seat 31A as opposed to center hole 312. The trench 314 is concavely formed at the sidewall of the cylindrical seat 31A near the pivot hole 313 and passed through the pivot hole 313. The pivot rod 35 is snapped fit and passed into the pivot hole 313 and partially exposed in the trench 314.

The striking assembly 32A is formed by bending a rigid wire into a paperclip form, and the striking assembly 32A comprises a pressing end 321, a striking end 322, an axle section 324 and a leverage section 325. The pressing end 321 and the striking end 322 are configured as the two opposite ends of the striking assembly 32A respectively. The striking end 322 is the end toward the bell portion 20, and the axle section 324 is disposed at an end section of the rigid wire, extended in a direction towards the center hole 312, and rotatably inserted into the center hole 312. The leverage section 325 lean against the pivot rod 35 which is partially exposed in the trench 314, and the striking end 322 has a striking block. When a force is applied to the pressing end 321 in a direction towards the base portion 10, the pivot rod 35 supports the leverage section as a pivot, and the striking assembly 32A is deformed. When the force is released from the pressing end 321, the striking assembly 32A bounces back and strikes the shell 212 to make a sound.

A fixing ring C is disposed at another side of the bottom plate 11 for installing the bicycle bell of the present invention onto the bicycle. In FIGS. 1 and 5 to 8, the fixing ring C is made of a circular-shaped rigid material, and fixed onto a bicycle handlebar by screwing or clamping, and the fixing ring C can also be an elastic ring used to tie the bicycle bell onto the bicycle handlebar by the elasticity of the fixing ring. With the above mentioned methods, the bicycle bell of the present invention can be installed onto the bicycle with the fixing ring C.

When using the bicycle bell of the present invention during the ride, a pushing or pulling force may be applied to the shell 212, so that the bell portion 20 can be moved between the two mechanical sections 123 of the base portion 10 to adjust the relative positions of the clapper 221 and the limiting column 12 in order to switch between the free striking state and the off state of the bicycle bell. When the bicycle bell is at the free striking state, the clapper 221 shakes and strikes the shell 212 to make a sound with the vibration during the ride. When the bicycle bell is at the off status, the clapper 221 is constrained by the limiting column 12, so that the clapper member 221 cannot shake or strike the shell 212, and the bell portion 20 cannot make a sound. If the rider wants to ring the bicycle bell situated in the off state, the rider can apply a pressure or a pulling force to the striking portion 30, so that the striking end 322 bounces and strike the shell 212 by the rebound force to make a sound.

While the invention has been described by means of specific embodiments, numerous modifications and variations could be made thereto by those skilled in the art without departing from the scope and spirit of the invention as set forth in the claims.

What is claimed is:

1. A bicycle bell comprising a base portion, a bell portion, and a striking portion installed adjacent to the base portion, wherein:
   the base portion has a limiting column protruding therefrom and a bottom plate;
   the bell portion comprises a shell assembly and a clapper assembly, wherein the clapper assembly movably is installed in the shell assembly, and the shell assembly is sheathed on the limiting column and can be situated in a first position and a second position of the limiting column
   wherein at least one part of the clapper assembly is at an outside of the limiting column, when the shell assembly is situated in the first position, and
   the clapper assembly is held by the limiting column to limit the movement of the clapper assembly when the shell assembly is situated in the second position; and
   the striking portion comprises a cylindrical seat, a pivot rod, and a striking assembly, wherein:
   the cylindrical seat extends outwardly from an edge of the bottom plate and comprises:
   a center hole disposed on a circular side of the cylindrical seat;
   a pivot hole passing through another circular side of the cylindrical seat; and
   a trench concavely formed on the sidewall of the cylindrical seat near the pivot hole, wherein the trench passes through the pivot hole;
   the pivot rod snaps fit and passes into the pivot hole, and partially exposed in the trench; and
   the striking assembly is formed by bending a rigid wire into a paperclip shape, and the striking assembly comprises:
   a pressing end;
   a striking end, configured as the end opposite to the pressing end on a striking member;
   an axle section, formed by extending an end section of the rigid wire in a direction towards the center hole, and coupled into the center hole; and
   a leverage section, leaning against the partially exposed pivot rod in the trench.

2. The bicycle bell according to claim 1,
   wherein the limiting column protrudes from and is disposed on one of the sides of the bottom plate, and the limiting column comprises:
   a center groove, passing through the limiting column;
   at least one rib, outwardly protruding from a middle section of the limiting column; and
   two mechanical sections, defined by the rib that divides the limiting column;
   the shell assembly further comprising:
   a sliding base sheathed on the two mechanical sections, wherein the sliding base's movement along the limiting column is restricted by the rib, and the sliding base comprising a hanging arm, passing through the center groove, and both ends of the hanging arm coupling to the sliding base; and
   a shell, disposed on a circular sidewall of the sliding base, and extending in a direction towards a free end of the limiting column to form a bell structure; and
   the clapper assembly further comprising:
   a clapper, having a protruding boss extending outwardly therefrom, and the protruding boss having an external diameter smaller than the center groove; and
   a hanging ring, coupled to the clapper assembly and the shell assembly.

3. The bicycle bell according to claim 2, wherein two of the ribs are disposed on two opposite sides of the middle section of the limiting column respectively, and the free end of the limiting column being concavely formed into a limiting section.

4. The bicycle bell according to claim 2, wherein the hanging ring is installed to an end of the protruding boss and the hanging rim passes through the hanging arm in the center groove.

5. The bicycle bell according to claim 4, wherein the striking member further comprises the pressing end the striking end configured to be the two opposite ends of the striking member, and the striking member is coupled to the base portion by an elastic member.

6. The bicycle bell according to claim 5, wherein the elastic member is a torsion spring or an extension spring.

* * * * *